United States Patent [19]
Bosack et al.

[11] 3,749,481
[45] July 31, 1973

[54] VERTICAL SLIT ADJUSTMENT DEVICE FOR A SLIT LAMP

[75] Inventors: Irwin A. Bosack; Milton H. Sussman, both of Buffalo, N.Y.

[73] Assignee: American Optical Corporation, Southbridge, Mass.

[22] Filed: Apr. 20, 1971

[21] Appl. No.: 135,563

[52] U.S. Cl. .................................................. 351/14
[51] Int. Cl. ............................................... A61b 3/10
[58] Field of Search .................................... 351/14

[56] References Cited
UNITED STATES PATENTS

| | | | |
|---|---|---|---|
| 2,999,422 | 9/1961 | Papritz | 351/14 |
| 3,405,994 | 10/1968 | Altman et al. | 351/14 |
| 3,433,560 | 3/1969 | Gambs | 351/14 |
| 3,533,685 | 10/1970 | Littmann et al. | 351/14 |

FOREIGN PATENTS OR APPLICATIONS

| | | | |
|---|---|---|---|
| 1,278,757 | 9/1968 | Germany | 351/14 |

OTHER PUBLICATIONS

George P. Elmstrom, "Whats New," J. Amer. Optom. Assoc., Vol. 35, No. 4, April 1964, pps. 345 & 346.

Primary Examiner—David Schonberg
Assistant Examiner—Paul A. Sacher
Attorney—William C. Nealon, Noble S. Williams and Bernard L. Sweeney

[57] ABSTRACT

A slit lamp illumination system in which the reflex mirror rotates about the axis of mirror incidence and about a pivot axis perpendicular thereto for combined horizontal and vertical sweep of the illumination beam across the eye interior. The objective lens remains parfocalized while the pivot action takes place. The pivot is by cam action between the mirror support and a tube assembly in which the mirror and objective are mounted.

3 Claims, 4 Drawing Figures

PATENTED JUL 31 1973 3,749,481

INVENTOR.
Irwin A. Bosack
Milton H. Sussman
BY
Robert J Bird
ATTORNEY

3,749,481

VERTICAL SLIT ADJUSTMENT DEVICE FOR A SLIT LAMP

BACKGROUND OF THE INVENTION

This invention relates to slit lamp apparatus, and more particularly to improvements in the illumination system of such apparatus.

The slit lamp is an instrument useful in the field of biomicroscopy and includes a suitable base or support by which to position a patient's head, an illumination system to direct a narrow slit or beam of light into the patient's eye, and a microscope for examination of the interior of the eye as illuminated by the slit. It is desirable that the illumination of the subject eye by the slit be controllable for the most effective observation of conditions within the patient's eye.

In the prior art, slit lamps are known having features by which the projected slit is controlled as to width and length, and also as to its rotational orientation. It is also known to have the mirror rotatable about its incidence axis to sweep the slit illumination in a horizontal direction relative to the subject eye.

SUMMARY OF THE INVENTION

It is an object of the present invention to provide a slit lamp apparatus in which the mirror is additionally pivotable about a pivot axis perpendicular to the mirror-incidence axis to sweep the slit illumination in a vertical direction relative to the subject eye as well as in a horizontal direction.

Another object is to provide slit lamp illumination, with the mirror pivotable about its pivot axis while keeping the objective lens parfocalized.

Another object is to provide such slit lamp illumination which can be incorporated on existing instruments already in the field.

Briefly, the present invention is practiced in one form by a slit lamp illumination system which has a folded illumination axis including a mirror-incidence axis and a mirror-reflection axis. The reflex mirror and its associated objective lens are mounted in a rotatable turret by which the mirror is rotatable about the mirror-incidence axis. Within this turret, the mirror is movable axially while simultaneously pivoting about a horizontal pivot axis. This sweeps the mirror-reflection axis and the slit illumination vertically relative to the subject eye. The illumination objective lens remains parfocalized during this pivoting of the reflex mirror.

DRAWING

Further objects, advantages, features of this invention will become apparent from the following description of one embodiment thereof, given in connection with the accompanying drawing.

DESCRIPTION

Figure 1:
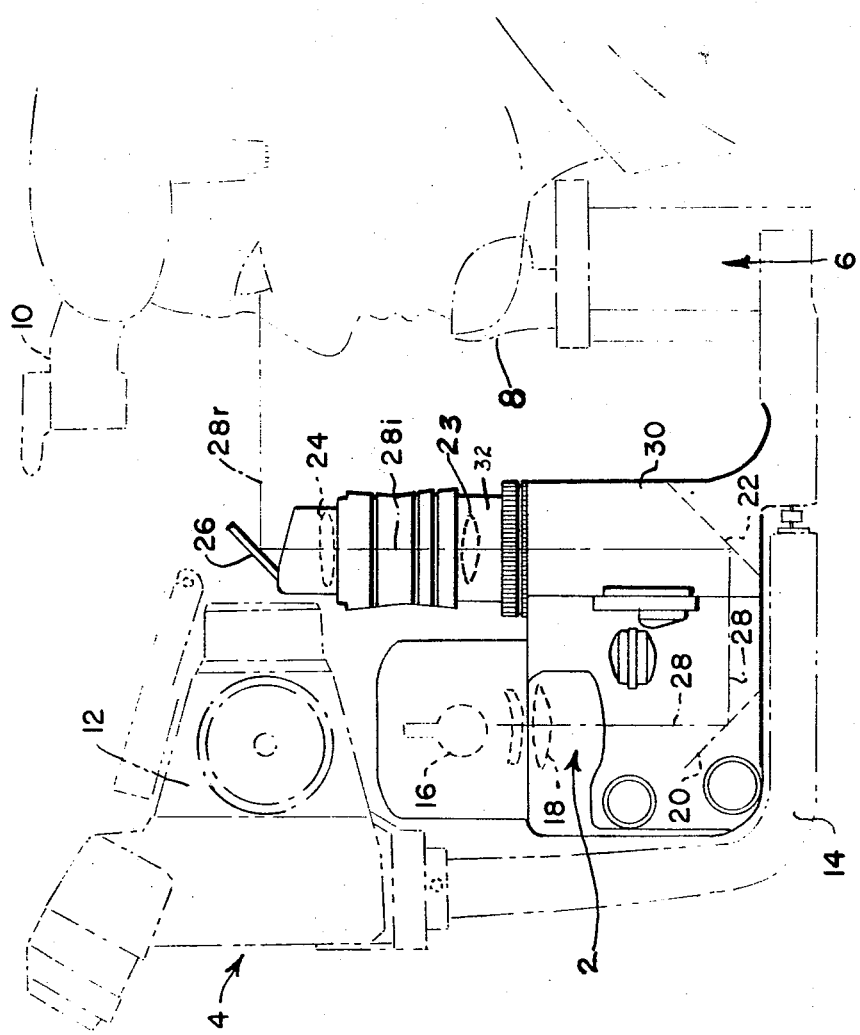
FIG. 1 is a side elevation view, partly in section, showing the environment of this invention.

Referring now to FIG. 1, a slit lamp assembly is partially shown and includes an illumination system, generally indicated at 2, an observation system, generally indicated at 4, and a patient's head positioning frame, generally indicated at 6. Frame 6 includes a chin rest 8 and a forehead rest 10 to immobilize the patient's head relative to the illumination and observation systems. Observation system 4 includes a stereo microscope 12 mounted on a frame 14 so as to view the eye of the patient, shown positioned relative to frame 6.

The illumination system includes a light source 16, a suitable condenser 18, a pair of mirrors 20 and 22 mounted at 45° angles, a collimator lens 23, an objective lens 24, and a reflex mirror 26, all disposed on a frame 30 along an illumination axis 28. Other elements such as reticles, filters, etc. may be present but are not essential to this invention. The illumination axis 28 as shown is folded and includes four parts in series. For clarity, two of these parts will sometimes herein be designated the mirror-incidence axis 28i and the mirror-reflection axis 28r.

Figure 2:
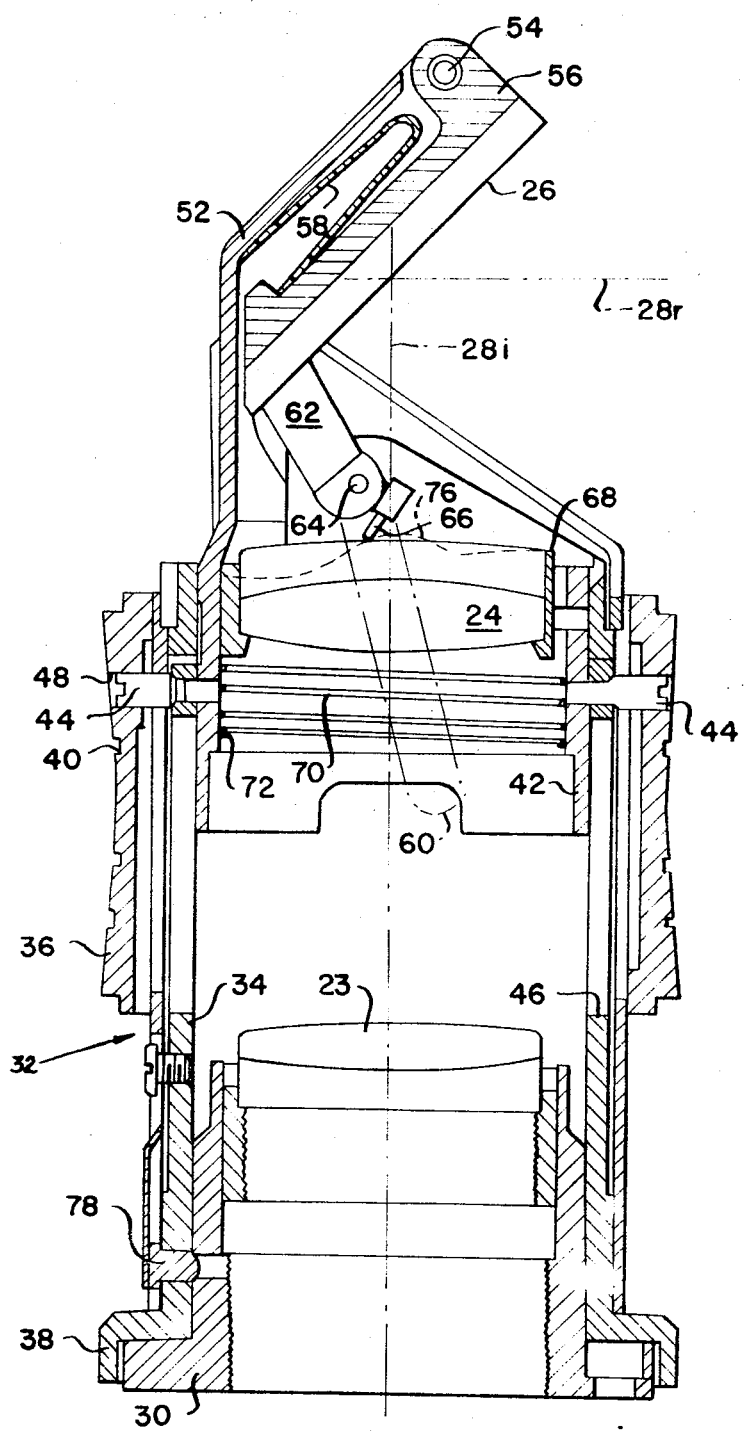
FIG. 2 is an enlarged sectional view of a part of the apparatus shown in FIG. 1.

Referring now to FIG. 2, mirror 26 and objective 24 are mounted in a turret 32 which is rotatable about axis 28i relative to the stationary frame member, represented at 30. Turret 32 includes a generally cylindrical tube member 34 partially surrounded by a cylindrical casing member 36. Tube member 34 has a knurled rim 38 by which it is turned. Casing member 36 is configured on its external surface 40 so as to be more readily gripped for movement thereof. Tube 34 fits over a suitable cylindrical aperture defined by the frame 30, and rests rotatably thereon.

A cylindrical lens housing 42, defining a circular aperture for the accommodation of objective lens 24, fits slidably within tube 34. Lens housing 42 is adapted for the fastening of a pair of projections 44 extending radially outwardly therefrom. Projections 44 extend through vertical slots 46 in tube 34, and through apertures 48 in casing member 36. Slots 46 permit the movement therealong of projections 44. The projections 44 and lens housing 42 are motivated up or down relative to tube 34 by the respective upward or downward movement of casing member 36. Projections 44 are preferably threaded into housing 42 so as to be integral therewith.

The lens housing 42, in addition to mounting the objective lens 24, includes an integral arm 52 extending upwardly. At its extremity, arm 52 is connected by a suitable pivot mechanism 54 to a mirror mount 56 on which is mounted the slit lamp reflex mirror 26. Arm 52 is configured so that the depending mirror 26 is suitably disposed on the illumination axis 28. A compression spring 58 is inserted between arm 52 and mirror mount 56 to take up lost motion to keep the pivoted mirror in its proper position.

The tube member 34 includes a pair of elongated slots 60 extending at an oblique angle relative to the mirror-incidence axis 28i. These slots 60 are parallel to each other and function as mirror pivot cams. Mirror mount 56 is connected to a pair of links 62 which spread out in opposite directions (into and out of the drawing) so as to straddle the light path. Each link 62 includes a projection 64, similar to projections 44, which extend radially therefrom through cam slots 60. Projections 64 are thus followers for cam slots 60. As cam followers 64 (with mirror 26 and lens having 42) are lowered relative to the stationary pivot cam slots 60 from the position shown, the cam followers 64 follow the inclined cam slot 60 and mirror 26 turns about pivot 54 in a counter-clockwise direction. When mirror 26 is thus pivoted, the mirror-reflection axis 28r is correspondingly swept in a vertical plane.

The pivoting of mirror 26 varies the dimension along mirror-incidence axis 28i between the mirror surface and the objective lens 24. To compensate for this, in order to keep the objective parfocalized, straddling links 62 are provided with bearing struts 66 and lens housing 42 is provided with a retaining ring 68 which holds the objective lens 24. Retaining ring 68 is mounted within lens housing 42 and is fitted against a compression spring 70 which is suitably fastened within the housing, as by means of a split ring 72. Compression spring 70 permits limited axial movement of the retaining ring 68 within the housing 42, this axial movement being relative to mirror 58. Retaining ring 68 is provided with a cam surface 76. Struts 66 bear against cam surface 76. When lens housing 42 with cam followers or projections 64 are lowered from the position shown, followers 64 and struts 66 move laterally relative to housing 42 (and retaining ring 68). This lateral movement provides cam action between struts 66 and cam surface 76. This action results in a certain axial displacement of retaining ring 68 on its spring 70 relative to housing 42. Cam surface 76 and struts 66 are so configured that the displacement of retaining ring 68 relative to housing 42, as the housing is axially moved, keeps objective lens 24 parfocalized at all positions of the mirror 26.

Figure 3:
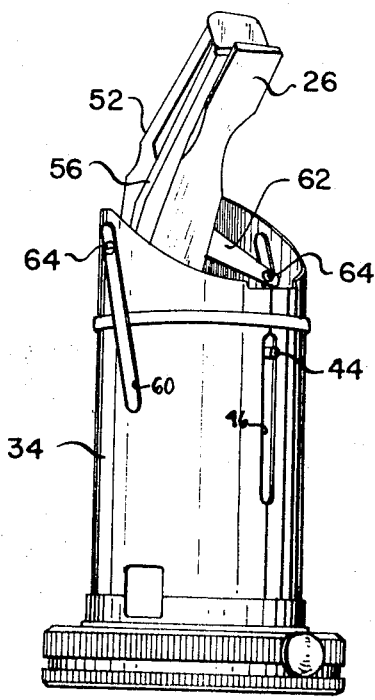
FIG. 3 is a perspective view of a part of the apparatus shown in FIG. 2.

Referring now to FIG. 3, the tube member 34 with lens housing 42 is shown in perspective and with casing 36 removed. From this view, the projection 44 extending from housing 42 is more readily seen to project through vertical slot 46. It is this projection or cam follower 44 by which the lens housing 42 is moved vertically relative to the tube member 34. This view also more clearly show certain other elements previously described. The links 62 which operatively connect cam followers 64 with the mirror 26 are more clearly shown as they straddle the light path of the instrument.

In the operation of this instrument, with tube member 34 held fixed, the raising or lowering of casing member 36 controls the raising or lowering of lens housing 42. The vertical displacement of lens housing 42 in turn causes the arcuate movement of mirror 26 about pivot 54, thus vertically displacing the mirror-reflection axis. If desired, this mirror-reflection axis can be swung in a horizontal plane by rotating tube member 34 by means of its rim portion 38. A detent mechanism, generally shown at 78, registers the tube member relative to the frame 30 in its "normal" position.

Figure 4:
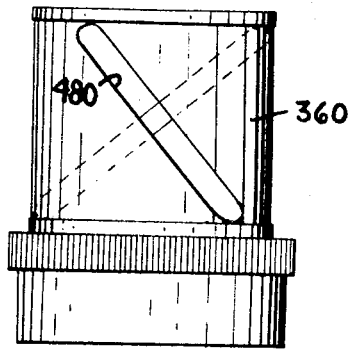
FIG. 4 is a side view of an alternative sleeve member which may be used with the structure shown in FIG. 2.

Referring now to FIG. 4, an alternative casing member 360 is shown in side view. In this modification, pair of helical cam slots 480 are shown and are displaced 180° apart around this member. This form of casing member may be used. It will be apparent that when casing member 360 is rotated relative to tube member 34, projections 44 act as cam followers and, with cam slots 480, effect the raising or lowering of lens housing 42.

It may occur to others of ordinary skill in the art to make modifications of this invention which will remain within its concept and scope and not constitute a departure. Accordingly, it is intended that the invention be not limited by the details of its description but only by the following claims.

What is claimed is:

1. A slit lamp apparatus including:
   an illumination system disposed along an illumination axis and including a light source, a condenser lens, an objective lens, and a mirror to direct light into the eye of a patient,
   an observation system to view the interior of the eye thus illuminated,
   said slit lamp apparatus characterized by the following improvement:
   said mirror being mounted for rotation about the mirror-incidence axis and mounted for pivoting about a pivot axis perpendicular to said mirror-incidence axis for combined horizontal and vertical swing adjustability of the direction of the axis of mirror-reflection,
   said objective lens being mounted in a lens housing, said mirror being pivotally mounted on said lens housing at said pivot axis,
   movably disposed, said tube assembly being coaxial with and rotatable about said mirror-incidence axis,
   adjustment means to move said lens housing axially relative to said tube assembly, and
   pivot means responsive to the axial movement of said lens housing relative to said tube assembly to vary the angular orientation of said mirror about said pivot axis.

2. The improvement defined in claim 1 wherein said pivot means include:
   a cam slot defined by said tube assembly and extending in a direction oblique to said mirror-incidence axis,
   a cam follower operatively connected between said mirror and said cam slot whereby the axial movement of said lens housing and mirror relative to said tube assembly causes said cam follower to displace laterally relative to said mirror-incidence axis and causes said mirror to swing about said pivot axis.

3. The improvement defined in claim 1 further including:
   a lens retaining ring resiliently mounted to and supporting said objective lens within said lens housing,
   means operatively disposed between said mirror and said retaining ring to effect the displacement of said retaining ring relative to said pivot axis when said lens housing is moved.

* * * * *